(12) United States Patent
Ikeda et al.

(10) Patent No.: US 7,258,794 B2
(45) Date of Patent: *Aug. 21, 2007

(54) PROCESS FOR PRODUCING PACKING FOR RESOLVING OPTICAL ISOMERS

(75) Inventors: Hirokazu Ikeda, Arai (JP); Atsushi Onishi, Tsukuba (JP); Koichi Murazumi, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 365 days.

This patent is subject to a terminal disclaimer.

(21) Appl. No.: 10/529,698

(22) PCT Filed: Oct. 9, 2003

(86) PCT No.: PCT/JP03/12942

§ 371 (c)(1),
(2), (4) Date: Mar. 29, 2005

(87) PCT Pub. No.: WO2004/034048

PCT Pub. Date: Apr. 22, 2004

(65) Prior Publication Data

US 2006/0016756 A1    Jan. 26, 2006

(30) Foreign Application Priority Data

Oct. 9, 2002   (JP) .............................. 2002-296533

(51) Int. Cl.
*B01D 15/08* (2006.01)
(52) U.S. Cl. .................. 210/656; 210/635; 210/198.2; 210/502.1; 366/287; 366/297

(58) Field of Classification Search ................ 210/635, 210/656, 659, 198.2, 502.1; 366/287, 288, 366/297, 298, 299, 300, 301
See application file for complete search history.

(56) References Cited

U.S. PATENT DOCUMENTS

| 6,136,925 A | 10/2000 | Muller et al. |
| 6,641,784 B1 * | 11/2003 | Okamoto et al. ............. 422/70 |
| 6,991,729 B2 * | 1/2006 | Ikeda et al. ................. 210/656 |

FOREIGN PATENT DOCUMENTS

EP    0 254 811 A    2/1988

(Continued)

OTHER PUBLICATIONS

Useful Chiral Packing Materials for High-Performance Liquid Chromatographic Resolution of Enantiomers: Phenylcarbamates of Polysaccharides Coated on Silica Gel, by Yoshio Okamoto et al, J. Am. Chem. Soc., vol. 106, No. 18, 1984, pp. 5357-5359.
European Patent Office Search Report dated Sep. 6, 2005 (3 pages).

*Primary Examiner*—Ernest G. Therkorn
(74) *Attorney, Agent, or Firm*—Flynn, Thiel, Boutell & Tanis, P.C.

(57) ABSTRACT

The present invention provides a production method with which a porous carrier can be allowed to evenly carry a polysaccharide derivative. That is, the present invention provides a method of producing an enantiomeric isomer-separating filler, including bringing a porous carrier and a solution of a polysaccharide derivative into contact with each other through a stirring operation in a stirring device, to allow the porous carrier to carry an optically active polymer compound, in which: a two-axis vertical stirring device is used as the stirring device; and the porous carrier is allowed to carry the polysaccharide derivative in a carrying amount of 23 mass % or more.

6 Claims, 8 Drawing Sheets

FOREIGN PATENT DOCUMENTS

| | | |
|---|---|---|
| EP | 0 656 333 | 6/1995 |
| EP | 1 334 967 | 8/2003 |
| EP | 1 391 239 | 2/2004 |
| EP | 1 496 356 A | 1/2005 |
| JP | 63-84626 | 4/1988 |
| JP | 63-171678 | 7/1988 |
| JP | 3-2009 | 1/1991 |
| JP | 10-158200 | 6/1998 |
| JP | 2001-124752 | 5/2001 |
| WO | WO96/14151 | 5/1996 |
| WO | WO 02/30903 | 4/2002 |
| WO | WO 02/083298 | 10/2002 |

* cited by examiner

PROCESS FOR PRODUCING PACKING FOR RESOLVING OPTICAL ISOMERS

REFERENCE TO RELATED APPLICATIONS

This application is a 371 of PCT/JP03/12942 filed Oct. 9, 2003.

TECHNICAL FIELD TO WHICH THE INVENTION BELONGS

The present invention relates to a method of producing an enantiomeric isomer-separating filler.

PRIOR ART

Conventionally, separation technologies including liquid chromatography, supercritical chromatography, and gas chromatography as a method of isolating a desired component from an isomer mixture or the like containing two or more components have widely been used for various kinds of analyses such as environmental analysis, metabolic analysis, and impurity analysis.

Those separation technologies are considered to be a kind of analysis technology, but have an aspect different from a technology for isolating a particular component in large quantities at a high purity from a mixture containing multiple components. In other words, the concept of "separation" in the field of analysis technology means separating each component from a mixture containing multiple components at a necessary level of purity for identifying each component. The term "separation" does not mean bulk separation and prevention of contamination of impurities.

On the other hand, in the fields of separation of physiologically active substances and separation of optically active antipodes, "separation" demands the separation of a single substance at a high purity. Therefore the separation of, for example, an optically active substance at a high purity in large quantities cannot be achieved by means of a separation technology at a chemical analysis level.

Incidentally, simulated moving bed chromatographic separation methods have been conducted to achieve separation on an industrial scale at a high purity. Under such circumstances, the demand for enantiomeric isomer-separating fillers has increased, and a technology with which an enantiomeric isomer-separating filler having stable quality can be produced on a large scale has been required.

Examples of a method of producing an enantiomeric isomer-separating filler include: a method proposed by Okamoto et al. (Y. Okamoto, M. Kawashima and K. Hatada, J. Am. Chem. 106, 5357, 1984), in which silica gel is immersed in a solution of polysaccharide derivatives and the solvent is distilled off; an impact method in high speed flow as disclosed in JP 3-2009 B, and a method of preparing a carrier by spraying as disclosed in JP 63-84626 A.

With each of those methods, an enantiomeric isomer-separating filler having separating performance that is satisfactory to some extent can be produced when further testing is performed at a laboratory level at which some hundred grams of an enantiomeric isomer-separating filler are produced.

However, when a researcher tried to produce an enantiomeric isomer-separating filler on an increased scale, in an amount of 1 kg to several ten kilograms, it turned out that an enantiomeric isomer-separating filler having excellent separating performance could not always be obtained by this method. For example, in an enantiomeric isomer-separating filler obtained by means of any one of those methods, to allow the carrier to evenly carry a polysaccharide derivative or the like, and to allow the inner walls of pores of the carrier to carry the polysaccharide derivative or the like are difficult. Besides, after the carrier is allowed to carry the polysaccharide derivative or the like, the solvent remaining in the carrier is uneven. Further, particles are formed through agglomeration of the polysaccharide derivative or the like which is not carried by the carrier. Those factors lower the separating performance to such an extent that the obtained filler cannot practically be used.

Also, when a column is filled with an enantiomeric isomer-separating filler and enantiomeric isomers are separated, a pressure loss is preferably low in order to let a liquid, gas, or super critical fluid pass through. In view of the above, generally, a method that possibly breaks the carrier cannot be employed. Even though the above mentioned method can provide an excellent filler in laboratory size, such a method cannot always provide good results with an enantiomeric isomer-separating filler produced in a large size for industrial production. Because a mixing/stirring power for a carrier and a polysaccharide derivative or the like becomes larger or changes in other various conditions are involved.

DISCLOSURE OF THE INVENTION

A purpose of the present invention is to provide a method of producing an enantiomeric isomer-separating filler which has high separating performance, which can be applied to levels ranging from a laboratory level to an industrial production level, and which is particularly suitable for an enantiomeric isomer-separating filler for simulated moving bed chromatography.

The invention according to claim 1 provides, as means for achieving the object, a method of producing an enantiomeric isomer-separating filler, including bringing a porous carrier and a solution of an optically active polymer compound into contact with each other through a stirring operation in a stirring device, to allow the porous carrier to carry the solution of the optically active polymer compound, in which:

a two-axis vertical stirring device is used as the stirring device; and the porous carrier is allowed to carry the optically active polymer compound in a carrying amount of 23 mass % or more.

In bringing the porous carrier and the solution of the optically active polymer compound into contact with each other in the two-axis vertical stirring device, any one of a method in which feeding of the porous carrier and the solution of the optically active polymer compound is performed before stirring of them with the two-axis vertical stirring device, a method in which the feeding and the stirring are performed in tandem with each other, and a method in which the stirring is started before the feeding can be applied to the order in which the feeding and the stirring are performed.

The carrying amount of the optically active polymer compound is a ratio of the compound in the enantiomeric isomer-separating filler, and substantially has a value determined from the following equation: the mass of the optically active polymer compound/(the mass of the porous carrier+the mass of the optically active polymer compound)×100.

The invention according to claim 2 provides, as another means for achieving the object, a method of producing an enantiomeric isomer-separating filler, including bringing a porous carrier and a solution of an optically active polymer compound into contact with each other through a stirring operation in a stirring device, to allow the porous carrier to carry the solution of the optically active polymer compound, in which:

a two-axis vertical stirring device is used as the stirring device;

a first step involving: feeding the porous carrier into the two-axis vertical stirring device; adding part of the solution of the optically active polymer compound with a required amount being divided into multiple fractions; and allowing the porous carrier to carry the optically active polymer compound through a stirring operation of the two-axis vertical stirring device, and a second step involving drying the porous carrier carrying the optically active polymer compound to remove a solvent are performed; and a combination of the first step and the second step is repeated a plurality of times by using a residual solution of the optically active polymer compound, to thereby allow the porous carrier to carry the optically active polymer compound.

In the filler, the porous carrier (such as silica gel) carrying the optically active polymer compound (such as a polysaccharide derivative) has many voids (openings). Since an enantiomeric isomer to be separated is adsorbed by the polymer compound present in the voids, a ratio of the voids plays an important role in specifying the carrying amount and separating performance of the polymer compound. The ratio of the voids with respect to the entire porous carrier is expressed as a void volume/the volume of the porous carrier (hereinafter, the ratio determined from the equation is referred to as a "void ratio"). When a porous carrier having a predetermined void ratio is allowed to carry an optically active polymer compound, the optically active polymer compound adheres to the voids, so the void volume reduces to change the void ratio. At this time, as described above, the control of the void volume, the void ratio, and the carrying amount of the polymer compound can be facilitated by repeating the combination of the first step and the second step plural times. As a result, the control of the separating performance can be facilitated, which is preferable.

DETAILED DESCRIPTION OF THE INVENTION

Figure 1:
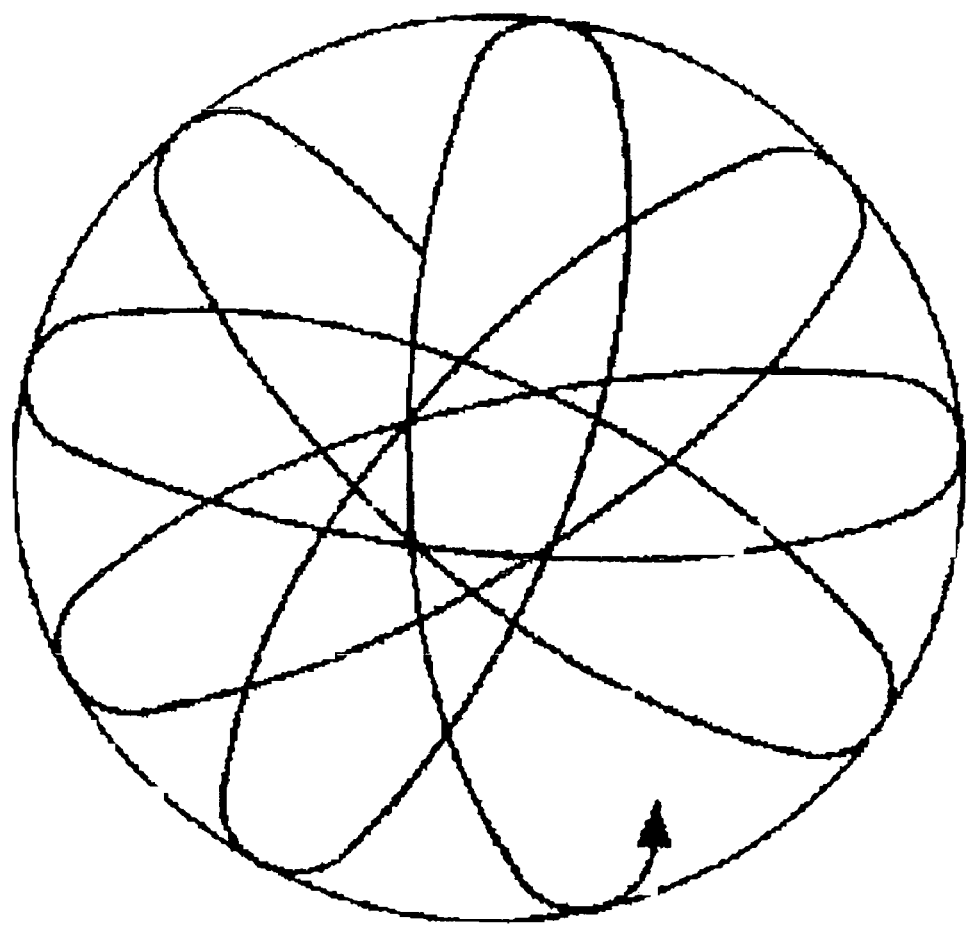
FIG. 1 is a drawing showing a revolution trajectory of a stirring blade in a two-axis vertical stirring device.

The production method of the present invention includes bringing a porous carrier and a solution of an optically active polymer compound into contact with each other under stirring in a two-axis vertical stirring device, to allow the porous carrier to carry the solution of the optically active polymer compound.

In bringing the porous carrier and the solution of the optically active polymer compound into contact with each other in the two-axis vertical stirring device, any one of:

(a) a method in which the porous carrier and the solution or dispersion of the optically active polymer compound are fed into the two-axis vertical stirring device before they are stirred with the stirring device (however, the order in which the porous carrier and the solution are fed and a method of feeding them can be appropriately modified);

(b) a method in which the porous carrier is placed into the two-axis vertical stirring device, and the optically active polymer compound is placed in tandem with stirring with the stirring device (however, the order in which the porous carrier and the compound are placed and a method of placing them can be appropriately modified); and (c) a method in which stirring with the two-axis vertical stirring device is started, and then the porous carrier and the solution or dispersion of the optically active polymer compound are placed into the two-axis vertical stirring device (however, the order in which the porous carrier and the solution or dispersion are placed and a method of placing them can be appropriately modified) can be applied. However, in the present invention, the method (b) is preferably adopted in order to enhance carrying performance of the porous carrier with respect to the optically active polymer compound.

The two-axis vertical stirring device is equipped with: a stirring tank for accommodating the porous carrier and the solution of the optically active polymer compound; and two stirring means (stirring blades) capable of stirring the inside of the tank. The stirring device may be equipped with a heating device (such as a heating jacket) as required.

The two stirring blades are preferably ones which revolve while rotating together. The rotation directions of the two stirring blades may be identical to or different from each other. The revolution of each of the two stirring blades is preferably set to draw a hypocycloid curve shown in FIG. 1 or a hypercyclone curve shown in FIG. 2.

When the two stirring blades operate as described above, the carrying performance of the porous carrier with respect to the optically active polymer compound (such as evenness of carrying or an increase in loading) can be enhanced. At the same time, the optically active polymer compound can be prevented from becoming a lump (particulate mass). Therefore, the porous carrier can be allowed to carry substantially a total amount of the optically active polymer compound used. In particular, when the revolution trajectory of each of the two stirring blades is a hypocycloid curve or a hypercyclone curve, there is no dead point in the stirring tank, and substances to be mixed (the porous carrier and the optically active polymer compound) which are building up without being stirred are eliminated. As a result, the carrying performance can be further enhanced.

Each of the two stirring blades may be a curved stirring rod or a curved stirring ring. When each of the two stirring blades is a curved stirring rod, the rod is preferably a hook-shaped rod or an anchor-type hook-shaped rod.

When the two stirring blades of those types are used, the stirring blades serve to press the substances to be mixed against each other or to knead them. As a result, when the substances are heated with a heating jacket, replacement of the substances at a position in contact with the heating jacket is smoothly performed, whereby an adverse effect of thermal hysteresis is prevented. The emergence of a lump is also prevented.

The capacity of the stirring tank can be appropriately set in accordance with the amounts of the porous carrier and the solution of the optically active polymer compound in a range from a laboratory scale to an industrial production scale. For example, the capacity can be set in the range of 0.03 to 3 m³.

A porous organic carrier or a porous inorganic carrier can be used as the porous carrier. Of those, a porous inorganic carrier is preferable.

Examples of appropriate porous organic carriers include polymer substances made of polystyrene, polyacrylamide, polyacrylate, and the like. Examples of appropriate porous inorganic carriers include silica, alumina, magnesia, glass, kaolin, titanium oxide, silicate, and hydroxyapatite. However, silica gel is particularly preferable. When silica gel is used, its surface is desirably subjected to silane treatment (silane treatment using aminopropylsilane), plasma treatment, or the like in order to eliminate the influence of silanol remaining on the silica gel surface and to enhance an affinity for the optically active polymer compound. However, no problems occur even when the surface is subjected to no treatment.

The porous carrier, particularly silica gel, has a particle size preferably in the range of 1 to 300 μm, more preferably in the range of 15 to 100 μm, still more preferably in the range of 20 to 50 μm, and an average pore size preferably in the range of 200 to 8,000 Å, more preferably in the range of 200 to 4,000 Å, still more preferably in the range of 300 to 2,000 Å. The particle size of the porous carrier is substantially the particle size of a filler.

An average pore size of the porous carrier in the above range is preferable because the solution of the optically active polymer compound is sufficiently immersed in pores and the optically active polymer compound tends to evenly adhere to the inner walls of the pores. Furthermore, the pores are not closed, so the pressure loss of the filler can be kept at a low level.

A polysaccharide derivative is preferably used as the optically active polymer compound. A polysaccharide, from which the polysaccharide derivative is derived, may be a synthetic polysaccharide, a natural polysaccharide or a natural product-modified polysaccharide. Anyone may be used as long as it is optically active. One having a high regularity of form of bonding is desirably used.

Examples of the polysaccharide include β-1,4-glucan (cellulose), α-1,4-glucan (amylose, amylopectin), α-1,6-glucan (dextran), β-1,6-glucan (pustulan), β-1,3-glucan (for example, curdlan, schizofillan, etc.), α-1,3-glucan, β-1,2-glucan (Crown Gall polysaccharide), β-1,4-galactan, β-1,4-mannan, α-1,6-mannan, β-1,2-fructan (inulin), β-2,6-fructan (levan), β-1,4-xylan, β-1,3-xylan, β-1,4-chitosan, α-1,4-N-acetylchitosan (chitin), pullulan, agarose, alginic acid, etc. as well as amylose-containing starch.

Among these, cellulose, amylose, β-1,4-xylan, β-1,4-chitosan, chitin, β-1,4-mannan, inulin, curdlan, etc., from which high purity polysaccharides are readily available, are preferred, with cellulose and amylose being particularly preferred.

The number average degree of polymerization (average number of pyranose or furanose ring contained in one molecule) of these polysaccharides is preferably 5 or more, more preferably 10 or more. There is no particular upper limit in the number average degree of polymerization but it is desirably 1,000 or less in consideration of ease of handling. It is more preferably 5 to 1,000, further more preferably 10 to 1,000, and particularly preferably 10 to 500.

Each of polysaccharide derivatives obtained by bonding the part or whole of the hydroxyl groups of the above polysaccharides with compounds having functional groups capable of reacting with hydroxyl groups through ester bonds, urethane bonds, ether bonds, and the like can be used as the polysaccharide derivative.

Examples of a compound having a functional group capable of reacting with a hydroxyl group, which may be any one as long as the compound has a leaving group, include an isocyanic acid derivative, a carboxylic acid, an ester, an acid halide, an acid amide compound, a halogen compound, an aldehyde, and an alcohol. Aliphatic, alicyclic, aromatic, and heteroaromatic compounds of the above compounds can also be used.

Examples of a particular preferable polysaccharide derivative include a polysaccharide ester derivative and a polysaccharide carbamate derivative. Examples of the polysaccharide ester derivative and the polysaccharide carbamate derivative include a compound obtained by substituting at least one of the atomic groups represented by the following formulae for the part or whole of hydrogen atoms on hydroxyl groups or on amino groups of a polysaccharide.

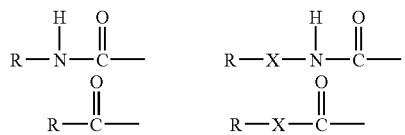

[In the formulae, R represents an aromatic hydrocarbon group which may contain a hetero atom, and may be unsubstituted or substituted by at least one group selected from the group consisting of an alkyl group having 1 to 12 carbon atoms, an alkoxy group having 1 to 12 carbon atoms, an alkylthio group having 1 to 12 carbon atoms, a cyano group, a halogen atom, an acyl group having 1 to 8 carbon atoms, an alkoxycarbonyl group having 1 to 8 carbon atoms, a nitro group, an amino group, and an alkylamino group having 1 to 8 carbon atoms.

Particularly preferable examples of the aromatic hydrocarbon group include a phenyl group, a naphthyl group, a phenanthryl group, an anthracyl group, an indenyl group, a furyl group, a thionyl group, a pyryl group, a benzofuryl group, a benzothionyl group, an indyl group, a pyridyl group, a pyrimidyl group, a quinolyl group, and an isoquinolyl group. Of those, a phenyl group, a naphthyl group, a pyridyl group, and the like are preferable. A halogenated phenyl group and an alkylphenyl group are particularly preferable.

X represents a hydrocarbon group having 1 to 4 carbon atoms which may contain a double bond or a triple bond. Examples of X include a methylene group, a methylmethylene group, an ethylene group, an ethylidene group, an ethenylene group, an ethynylene group, a 1,2- or 1,3-propylene group, and a 1,1- or 2,2-propyridine group.]

The polysaccharide carbamate derivative can be obtained by reacting an isocyante represented by the below shown formula with a polysaccharide. The polysaccharide ester derivative can be obtained by reacting an acid chloride represented by the below shown formula with a polysaccharide.

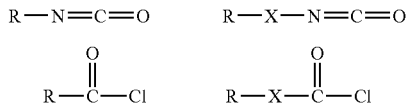

(In the formulae, R and X each have the same meaning as above.)

An introducing ratio of a substituent into a polysaccharide derivative is preferably in the range of 10% to 100%, more preferably in the range of 30% to 100%, still more preferably in the range of 80% to 100%. An introducing ratio of 10% or more is preferable because an optical resolution ability increases. An introducing ratio of 30% or more is preferable because sufficient separating performance can be achieved regardless of the type and concentration of a mixture of enantiomeric isomers to be subjected to optical resolution. An introducing ratio of 80% or more is particularly preferable because a particle excellent in enantiomeric isomer separating performance can be obtained. The introducing ratio of a substituent can be determined by investigating changes in carbon, hydrogen, and nitrogen before and after substituent introduction through elemental analysis.

The solution or dispersion of the optically active polymer compound is composed of a polymer compound such as any one of the above polysaccharide derivatives and an organic solvent.

Examples of the organic solvent include: ketones such as acetone and methyl ethyl ketone; aromatic carboxylic acid alkyl esters including a benzoic acid alkyl ester such as methyl benzoate; and halogen compounds such as methylacetamide, methylene chloride, and chloroform.

A mixing ratio between the optically active polymer compound and the organic solvent is preferably 300 to 10,000 parts by mass, more preferably 300 to 1,000 parts by mass of the organic solvent with respect to 100 parts by mass of the optically active polymer compound.

A ratio between the porous carrier and the solution or dispersion of the optically active polymer compound is preferably 100 to 500 parts by mass, more preferably 100 to 300 parts by mass of the solution or dispersion of the optically active polymer compound with respect to 100 parts by mass of the porous carrier.

A total volume of the porous carrier and the solution or dispersion of the optically active polymer compound with respect to the stirring tank capacity of the two-axis vertical stirring device is such that the total volume of the porous carrier and the solution or dispersion of the optically active polymer compound is preferably 0.1 to 0.8 $m^3$, more preferably 0.2 to 0.5 $m^3$ with respect to the stirring tank capacity of 1 $m^3$.

A temperature condition at the time of stirring is preferably in the range of room temperature to 80° C., more preferably in the range of room temperature to 60° C.

An operation condition for the stirring blades varies depending on parameters such as: the capacity of the stirring tank; the amounts of the porous carrier and the solution or dispersion of the optically active polymer compound used; the shapes of the stirring blades; the rotational speeds of the stirring blades; and the rotation trajectories of the stirring blades. However, when the numerical ranges of the above parameters are satisfied, stirring for about 10 to 300 minutes allows the porous carrier to carry the optically active polymer compound.

When the porous carrier and the solution or dispersion of the optically active polymer compound are stirred in the two-axis vertical stirring device, they may be irradiated with light, radiation such as a γ ray, or an electromagnetic wave such as a microwave to enhance a bonding force between the porous carrier and the optically active polymer compound.

The above stirring processing using the two-axis vertical stirring device allows the porous carrier to carry the optically active polymer compound. The carrying state varies depending on a combination of the porous carrier and the optically active polymer compound, and ranges from a state where the optically active polymer compound merely adheres to the porous carrier to a state where the porous carrier and the optically active polymer compound are chemically bound to each other. Therefore, as described above, the porous carrier and the optically active polymer compound may be irradiated with light, radiation such as a γ ray, or an electromagnetic wave such as a microwave to enhance the bonding force between the porous carrier and the optically active polymer compound as required.

After the completion of the stirring processing, the organic solvent is removed through drying processing, and furthermore, as required, classification processing such as a vibrating screen, a cyclone, air classification, or wet classification, washing processing, and drying processing can be performed.

The above production method can provide an enantiomeric isomer-separating filler in which the porous carrier is allowed to carry the optically active polymer compound in a carrying amount of 23 mass % or more.

The carrying amount as used herein is represented by a ratio of the weight of the polysaccharide derivative to the weight of the filler. The carrying amount of the polysaccharide derivative on the carrier is preferably 23 mass % or more with respect to the carrier. The carrying amount is more preferably 27 mass % or more from the view point of productivity. There is no particular technical upper limit of the carrying amount. A carrying amount of 60 mass % or less is preferable because no reduction in separation efficiency due to a reduction in number of stages occurs. The carrying amount is particularly preferably in the range of 27 mass % to 45 mass %.

In the production method of the present invention, as described above, the method (b) is preferably applied in bringing the porous carrier and the solution of the optically active polymer compound into contact with each other in the two-axis vertical stirring device. However, as described below, it is particularly preferable to modify the method (b) for achieving the object of the present invention.

First, the porous carrier is fed into the two-axis vertical stirring device, and part of the solution or dispersion of the optically active polymer compound with a required amount being divided into multiple fractions is added. At this time, the number of divisions, which is not particularly limited, is preferably 2 to 6, more preferably 2 to 4.

Next, the porous carrier is allowed to carry the optically active polymer compound through a stirring operation of the two-axis vertical stirring device.

Then, the porous carrier carrying the optically active polymer compound is dried to remove a solvent.

The combination of the above steps is counted as one process. The process is repeated a plurality of times, preferably 2 to 6 times, more preferably 2 to 4 times. The amounts of the solution or dispersion of the optically active polymer compound to be added for the respective times may be the same or different.

The enantiomeric isomer-separating filler obtained by means of the production method of the present invention is preferably used for a separation column of simulated moving bed chromatography intended to obtain several milligrams to several kilograms of an optically active substance.

The column has a ratio L/D of the length (L) of one column to the inner diameter (D) of the column preferably in the range of 0.01 to 100, more preferably in the range of 0.01 to 60, still more preferably in the range of 0.01 to 30.

Adsorption and separation by means of simulated moving bed chromatography are carried out by continuously circulating an adsorption operation, a condensation operation, a desorption operation, and a desorbed liquid collection operation described below as basic operations.

(1) Adsorption Operation

A mixture of enantiomeric isomers contacts an enantiomeric isomer-separating filler. Then, an enantiomeric isomer that is easily adsorbed (strong adsorption component) is adsorbed, while other enantiomeric isomer that is hardly adsorbed (weak adsorption component) is collected as a raffinate flow together with a desorbed liquid.

(2) Condensation Operation

The enantiomeric isomer-separating filler that has adsorbed the strong adsorption component is allowed to contact part of an extract to be described later, so the weak adsorption component remaining on the enantiomeric isomer-separating filler is expelled to condense the strong adsorption component.

(3) Desorption Operation

The enantiomeric isomer-separating filler containing the condensed strong adsorption component is allowed to contact the desorbed liquid, so the strong adsorption component is expelled from the enantiomeric isomer-separating filler to be collected as an extract flow accompanying the desorbed liquid.

(4) Desorbed Liquid Collection Operation

The enantiomeric isomer-separating filler adsorbing substantially only the desorbed liquid contacts part of the raffinate flow, so part of the desorbed liquid in the enantiomeric isomer-separating filler is collected as a desorbed liquid collection flow.

In the adsorption and separation by means of simulated moving bed chromatography, a total number of columns to be used for performing the adsorption operation, the condensation operation, the desorption operation, and the desorbed liquid collection operation described above (each of the columns should have the above L/D ratio) is preferably 4 to 32, more preferably 4 to 12, still more preferably 4 to 8.

Figure 3:
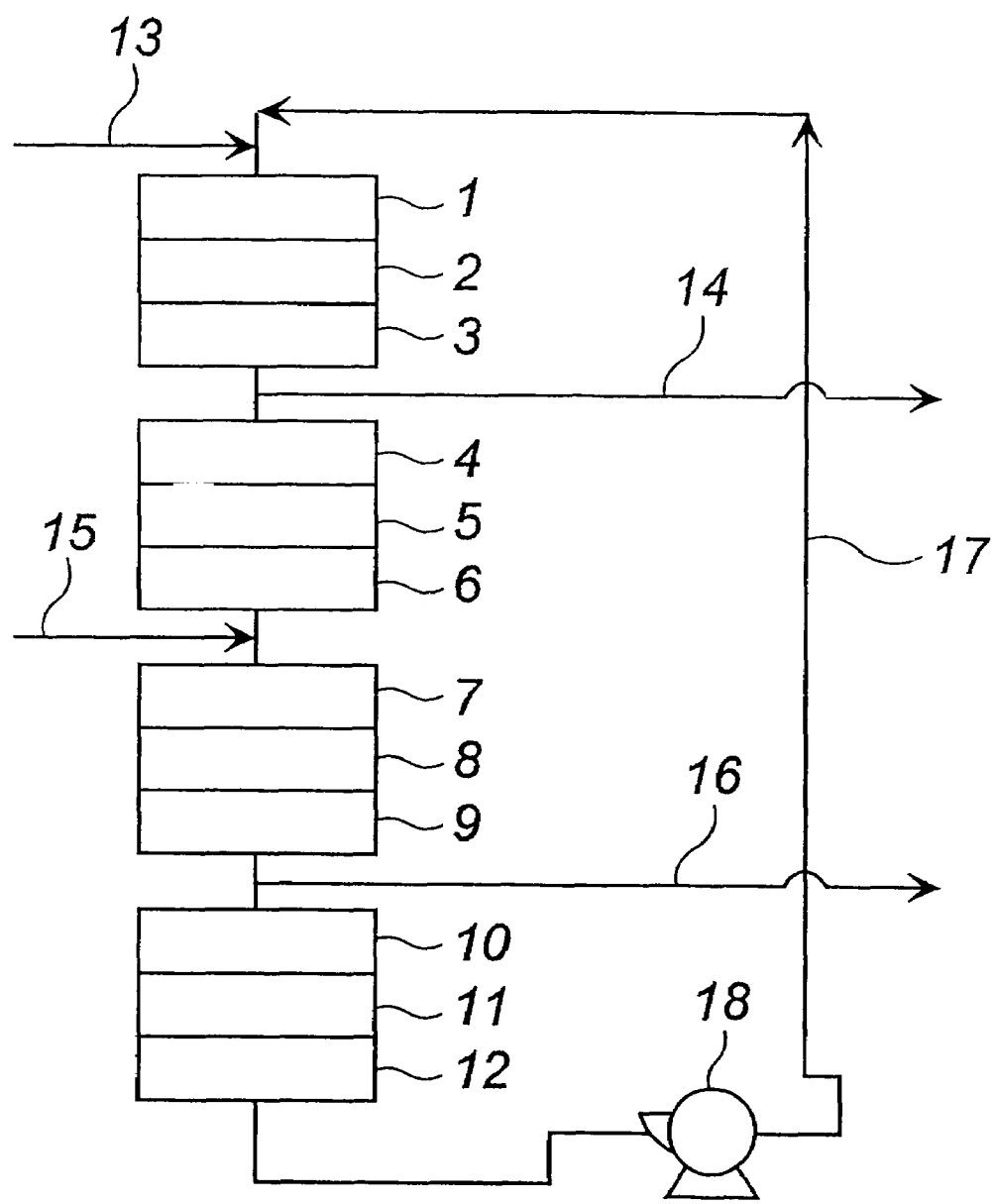
FIG. 3 is a conceptual drawing showing an example of a simulated moving bed mode.
Figure 4:
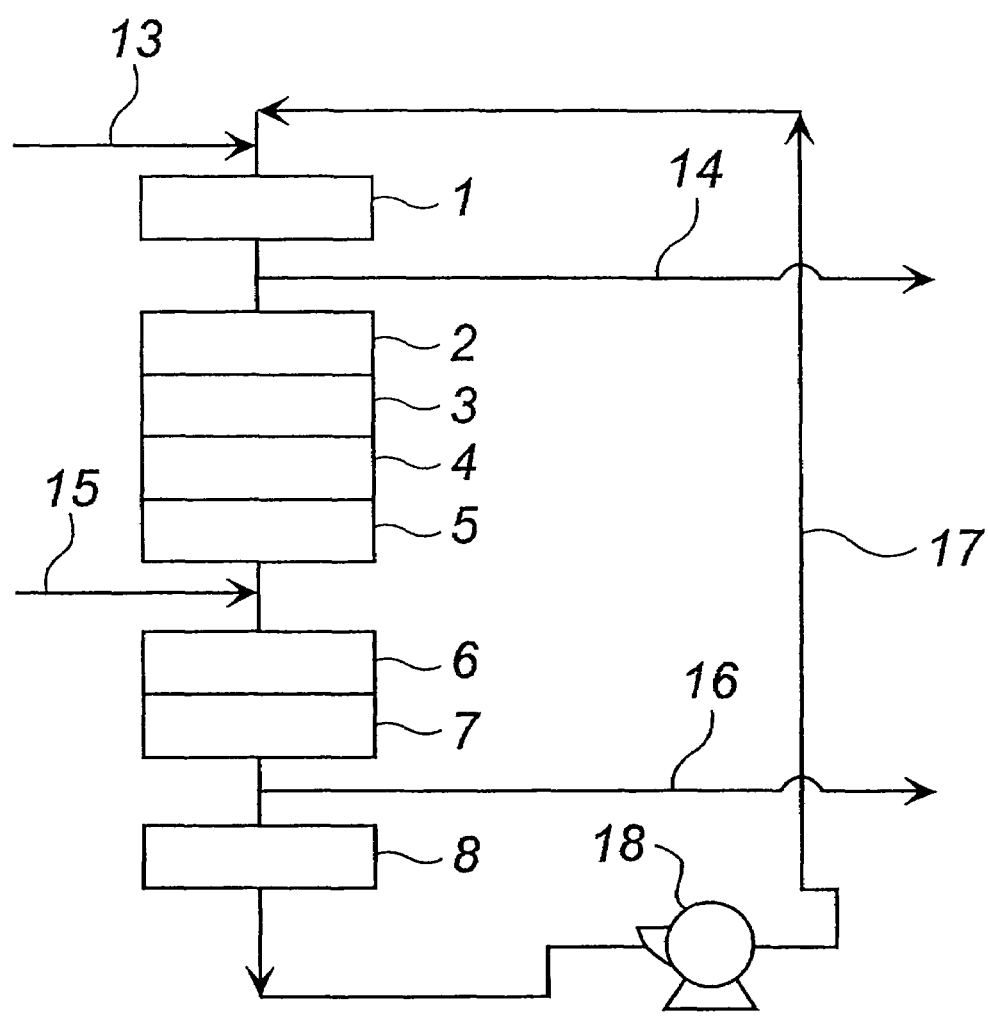
FIG. 4 is a conceptual drawing showing another example of the simulated moving bed mode.
Figure 5:
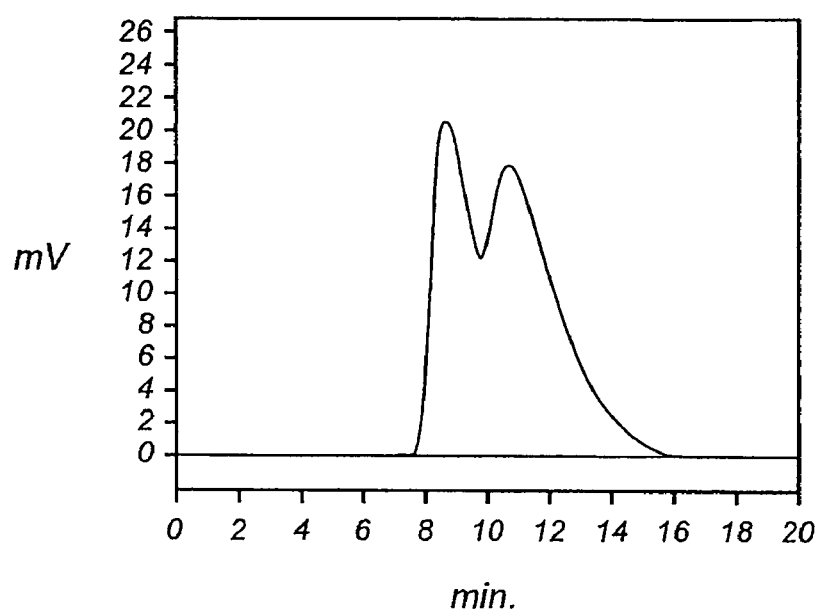
FIG. 5 shows a chromatogram using a column of Example 1 obtained in Applied Example 1.
Figure 6:
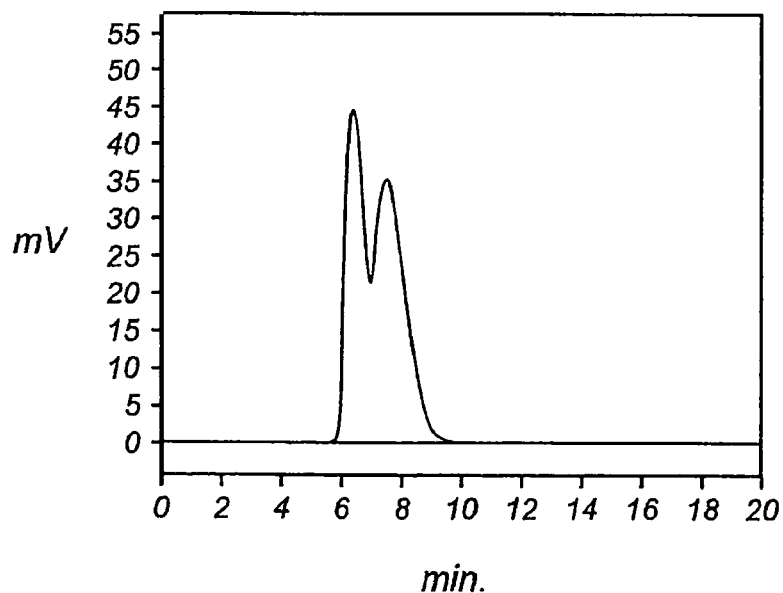
FIG. 6 shows a chromatogram using a column of Example 2 obtained in Applied Example 1.
Figure 7:
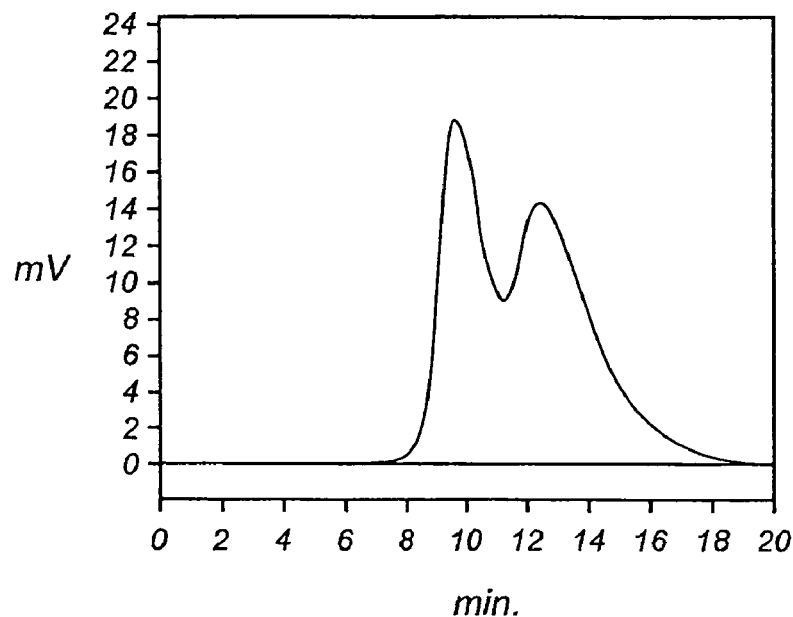
FIG. 7 shows a chromatogram using a column of Example 3 obtained in Applied Example 1.
Figure 8:
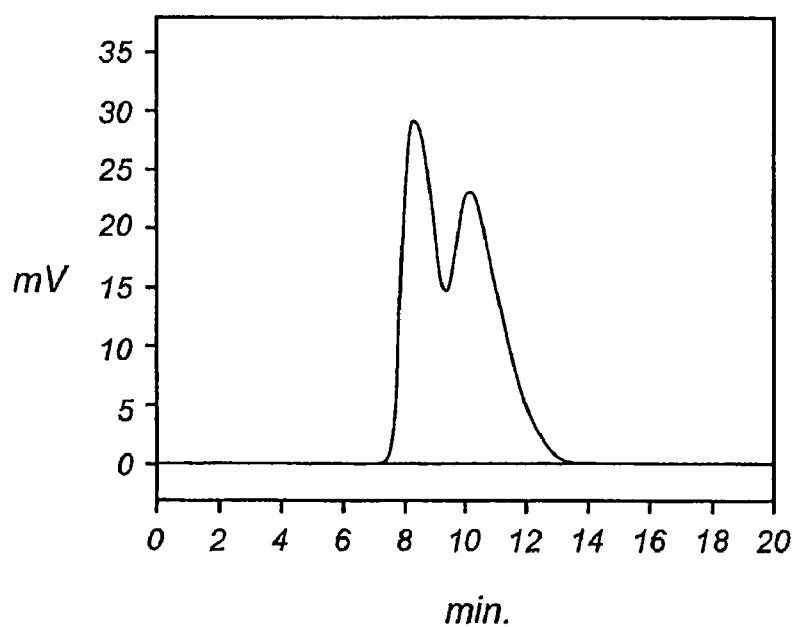
FIG. 8 shows a chromatogram using a column of Example 4 obtained in Applied Example 1.
Figure 9:
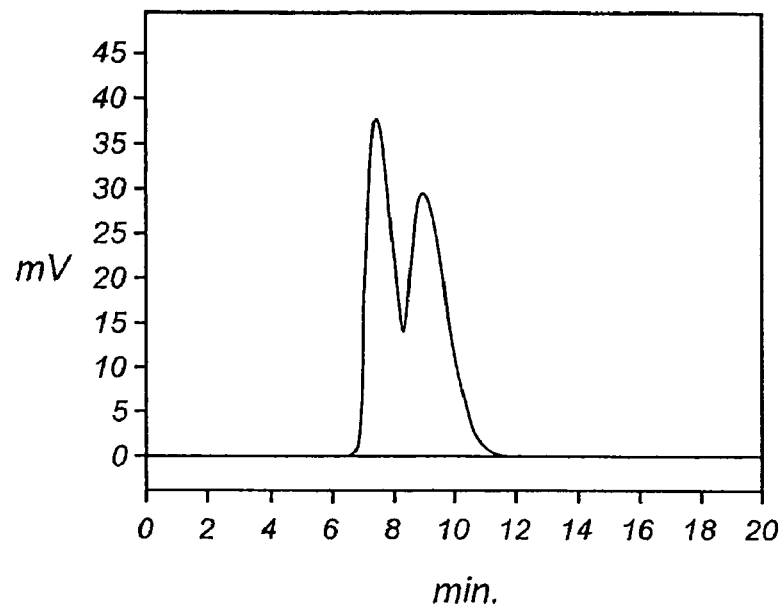
FIG. 9 shows a chromatogram using a column of Example 5 obtained in Applied Example 1.
Figure 10:
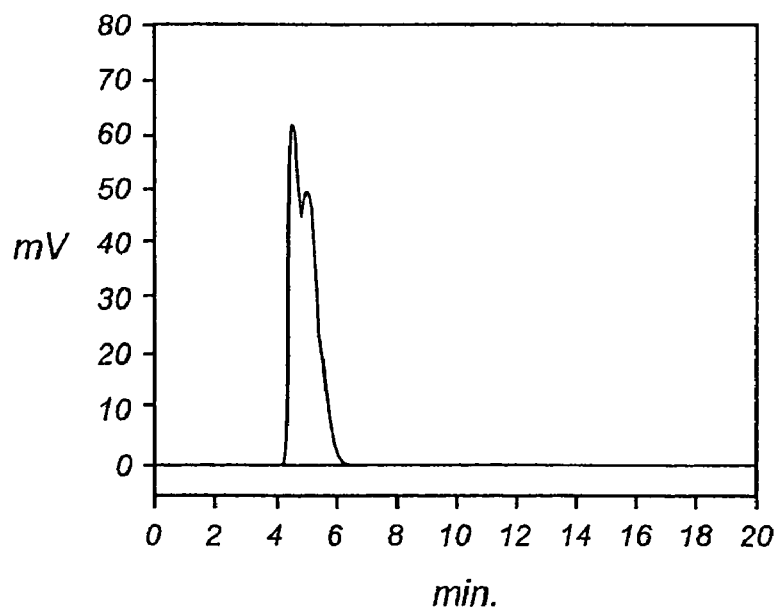
FIG. 10 shows a chromatogram using a column of Comparative Example 1 obtained in Applied Example 1.
Figure 11:
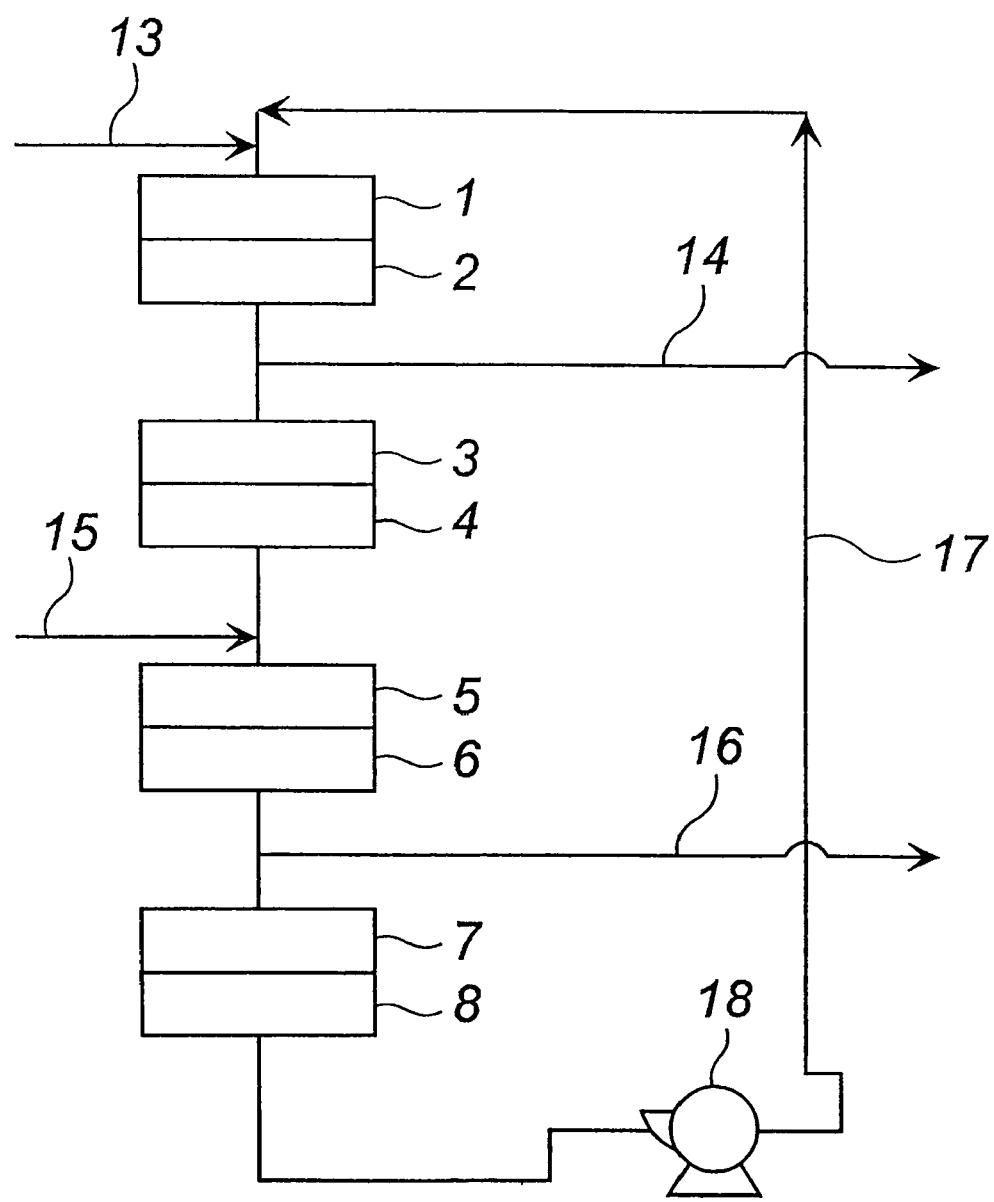
FIG. 11 is a conceptual drawing showing a continuous liquid chromatograph-separation device of a small-simulated moving bed mode.

Hereinafter, a simulated moving bed chromatography method will be described with reference to the drawings. FIG. 3 is a schematic drawing showing an example of a simulated moving bed according to the present invention. FIG. 4 is a schematic drawing showing another example of the simulated moving bed according to the present invention. In FIG. 3, the inside of a packed bed serving as a main portion of the simulated moving bed is divided into 12 unit packed beds. In FIG. 4, the inside is divided into 8 unit packed beds. However, the number and sizes of the unit packed beds depend on factors such as the composition and flow rate of an enantiomeric isomer mixture-containing liquid, a pressure loss, and the size of the device, and are not limited.

In FIG. 3, reference numerals 1 to 12 each denote a chamber (adsorption chamber) filled with a filler, and the chambers are coupled to one another. Reference numeral 13 denotes a desorbed liquid supplying line; 14, an extract drawing line; 15, an enantiomeric isomer-containing liquid supplying line; 16, a raffinate drawing line; 17, a recycle line; and 18, a pump.

In an arrangement state of the adsorption chambers 1 to 12 and the lines 13 to 16 shown in FIG. 3, the adsorption chambers 1 to 3 perform the desorption operation, the adsorption chambers 4 to 6 perform the condensation operation, the adsorption chambers 7 to 9 perform the adsorption operation, and the adsorption chambers 10 to 12 perform the desorbed liquid collection operation. In such a simulated moving bed, each of the supplying lines and the drawing lines is moved by one adsorption chamber in a liquid flowing direction through a bulb operation every predetermined time period. Accordingly, in the next arrangement state of the adsorption chambers, the adsorption chambers 2 to 4 perform the desorption operation, the adsorption chambers 5 to 7 perform the condensation operation, the adsorption chambers 8 to 10 perform the adsorption operation, and the adsorption chambers 11, 12, and 1 perform the desorbed liquid collection operation. Such an operation is performed successively, whereby processing of separating the mixture of enantiomeric isomers can be continuously and efficiently achieved.

In addition, in an arrangement state of the adsorption chambers 1 to 8 and the lines 13 to 16 shown in FIG. 4, the adsorption chamber 1 performs the desorption operation, the adsorption chambers 2 to 5 perform the condensation operation, the adsorption chambers 6 and 7 perform the desorption operation, and the adsorption chamber 8 performs the desorbed liquid collection operation.

In such a simulated moving bed, each of the supplying lines and the drawing lines is moved by one adsorption chamber in a liquid flowing direction through a bulb operation every predetermined time period. Accordingly, in the next arrangement state of the adsorption chambers, the adsorption chamber 2 performs the desorption operation, the adsorption chambers 3 to 6 perform the condensation operation, the adsorption chambers 7 and 8 perform the adsorption operation, and the adsorption chamber 1 performs the desorbed liquid collection operation. Such an operation is performed successively, whereby processing of separating the mixture of enantiomeric isomers can be continuously and efficiently achieved.

According to the production method of the present invention, there can be provided an enantiomeric isomer-separating filler in which a porous carrier is allowed to carry an optically active polymer compound in a carrying amount of 23 mass % or more. Furthermore, an enantiomeric isomer-separating filler having a carrying amount of the optically active polymer compound of about 60 mass % can be obtained depending on purposes. From the viewpoint of the separating performance of the enantiomeric isomer-separating filler, the carrying amount of the optically active polymer compound is adjusted to fall within the range of preferably 23 to 50 mass %, more preferably 23 to 40 mass %.

In particular, out of the production methods of the present invention, a method in which the optically active polymer compound is carried on the porous carrier separately a plurality of times is applied, whereby an enantiomeric isomer-separating filler in which the porous carrier is allowed to carry a desired carrying amount of the optically active polymer compound can be easily obtained.

The enantiomeric isomer-separating filler obtained by means of the production method of the present invention can be applied to an enantiomeric isomer analysis technology in which a wide variety of chiral compounds are sampled with high productivity and subjected to optical resolution in analysis of a pharmaceutical preparation, a food, an agricultural chemical, a perfume, or the like and to enantiomeric isomer separation on an industrial scale utilizing a simulated moving bed mode, when it is preferably applied to pseudo-moving-bed chromatography.

EFFECT OF THE INVENTION

According to the production method of the present invention, there can be provided an enantiomeric isomer-separating filler in which a porous carrier is allowed to carry a polysaccharide derivative in a carrying amount of 23 mass % or more.

EXAMPLES

Figure 2:
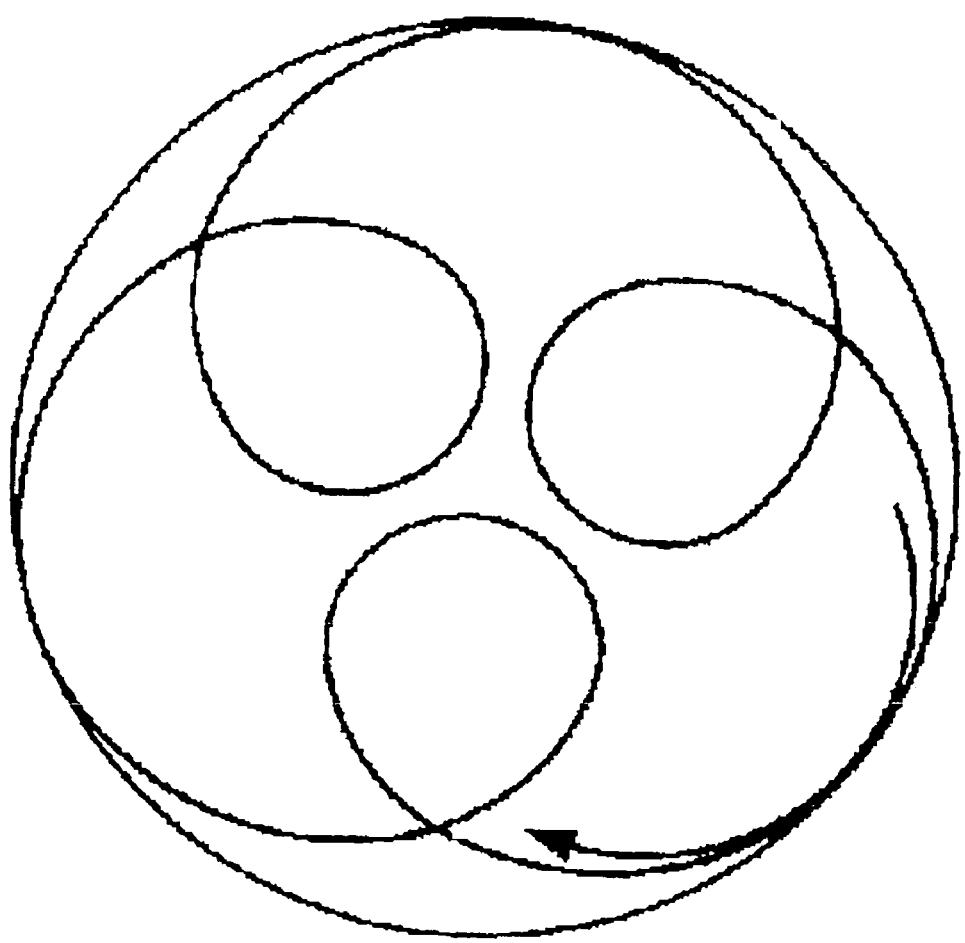
FIG. 2 is a drawing showing another revolution trajectory of the stirring blade in the two-axis vertical stirring device.

Hereinafter, the present invention will be described in detail by way of examples. However, the present invention is not limited to these examples. Details about a planetary stirring mixer used in examples are as follows.
Stirring blade: Two blades (They revolve while rotating together, but their rotation directions are the same.)
Shape of stirring blade: Curved stirring rod (hook-shaped)
Revolution trajectory of stirring blade: Hypocycloid curve as shown in FIG. 1
Capacity of stirring tank: 10 L for Example 3, 0.8 L for examples other than Example 3
Rpm of stirring blade: 45 rpm for rotation, 23 rpm for revolution
Stirring time: 60 minutes Example 1 (Enantiomeric Isomer-Separating Filler Carrying amylose tris(3,5-dimethylphenylcarbamate))

(1) Synthesis of amylose tris(3,5-dimethylphenylcarbamate)

Under a nitrogen atmosphere, 100 g of amylose and 850 g of 3,5-dimethylphenyl isocyanate were stirred in 4 L of dry pyridine under heating at 100° C. for 60 hours, and then the resultant was placed into 60 L of methanol. The precipitated solid was filtered out and washed with methanol, followed by vacuum drying (60° C., 15 hours). As a result, 335 g of a yellowish white powdery solid was obtained (90%).

(2) Allowing Silica Gel to Carry amylose tris(3,5-dimethylphenylcarbamate)

87.5 g of amylose tris(3,5-dimethylphenylcarbamate) obtained in (1) were dissolved into 747 ml of ethyl acetate at 8.5 times equivalent (wt/vol) to prepare a dope, which was divided into 4 fractions.

Next, 162.5 g of silica gel subjected to surface inactivating treatment (average particle size: 20 μm, average pore size: 1,300 Å) were fed into the planetary stirring mixer, and then a ¼ amount of the polymer dope was placed into it.

Next, the planetary stirring mixer was actuated. The stirring conditions were as the above. The stirring was performed at room temperature.

After the completion of the first stirring, the solvent (ethyl acetate) was distilled off under a reduced pressure condition while it was heated. Such a stirring operation was repeated 4 times to obtain a target filler carrying amylose tris(3,5-dimethylphenylcarbamate).

(3) Preparation of Filling Column for HPLC from Prepared Filler

The filler carrying amylose tris(3,5-dimethylphenylcarbamate) prepared in (2) was filled in a stainless column having a length of 25 cm and an inner diameter of 0.46 cm (L/D=54.3) by means of a slurry filling method to prepare a separating column for an enantiomeric isomer.

Example 2 (Enantiomeric Isomer-Separating Filler Carrying amylose tris(3,5-dimethylphenylcarbamate))

(1) Synthesis of amylose tris(3,5-dimethylphenylcarbamate)

Amylose tris(3,5-dimethylphenylcarbamate) was prepared in the same manner as in (1) of Example 1.

(2) Allowing Silica Gel to Carry Amylose tris(3,5-dimethylphenylcarbamate)

36 g of amylose tris(3,5-dimethylphenylcarbamate) obtained in (1) were dissolved into 277 ml (7.5 times equivalent (wt/vol)) of a mixed solvent of chloroform and DMAc (vol/vol) to prepare a dope, which was divided into 4 fractions.

Next, 54 g of silica gel subjected to surface inactivating treatment (average particle size: 20 μm, average pore size: 1,300 Å) were fed into the planetary stirring mixer, and then a ¼ amount of the polymer dope was placed into it.

Next, the planetary stirring mixer was actuated. The stirring conditions were as the above. The stirring was performed at room temperature.

After the completion of the first stirring, the solvent was distilled off under a reduced pressure condition while it was heated. Such a stirring operation was repeated 4 times to obtain a target filler carrying amylose tris(3,5-dimethylphenylcarbamate).

(3) Preparation of Filling Column for HPLC from Prepared Filler

The filler carrying amylose tris(3,5-dimethylphenylcarbamate) prepared in (2) was filled in a stainless column having a length of 25 cm and an inner diameter of 0.46 cm by means of a slurry filling method to prepare a separating column for an enantiomeric isomer.

Example 3 (Enantiomeric Isomer-Separating Filler Carrying amylose tris(3,5-dimethylphenylcarbamate))

(1) Synthesis of amylose tris(3,5-dimethylphenylcarbamate)

Amylose tris(3,5-dimethylphenylcarbamate) was prepared in the same manner as in (1) of Example 1.

(2) Allowing Silica Gel to Carry amylose tris(3,5-dimethylphenylcarbamate)

750 g of amylose tris(3,5-dimethylphenylcarbamate) obtained in (1) were dissolved into 6.6 L (8.8 times equivalent (wt/vol)) of a mixed solvent of chloroform and DMAc (vol/vol) to prepare a dope, which was divided into 3 fractions.

Next, 1.75 kg of silica gel subjected to surface inactivating treatment (average particle size: 20 μm, average pore size: 1,300 Å) were fed into the planetary stirring mixer, and then a ⅓ amount of the polymer dope was placed into it.

Next, the planetary stirring mixer was actuated. The stirring conditions were as the above. The stirring was performed at room temperature.

After the completion of the first stirring, the solvent was distilled off under a reduced pressure condition while it was heated. Such a stirring operation was repeated 3 times to obtain a target filler carrying amylose tris(3,5-dimethylphenylcarbamate).

(3) Preparation of Filling Column for HPLC from Prepared Filler

The filler carrying amylose tris(3,5-dimethylphenylcarbamate) prepared in (2) was filled in a stainless column having a length of 25 cm and an inner diameter of 0.46 cm by means of a slurry filling method to prepare a separating column for an enantiomeric isomer.

Example 4 (Enantiomeric Isomer-Separating Filler Carrying amylose tris(3,5-dimethylphenylcarbamate))

(1) Synthesis of amylose tris(3,5-dimethylphenylcarbamate)

Amylose tris(3,5-dimethylphenylcarbamate) was prepared in the same manner as in (1) of Example 1.

(2) Allowing Silica Gel to Carry amylose tris(3,5-dimethylphenylcarbamate)

12.5 g of amylose tris(3,5-dimethylphenylcarbamate) obtained in (1) were dissolved into 125 ml of ethyl acetate at 10 times equivalent (wt/vol) to prepare a dope, which was divided into 2 fractions.

Next, 37.5 g of silica gel subjected to surface inactivating treatment (average particle size: 20 μm, average pore size: 1,300 Å) were fed into the planetary stirring mixer, and then a ½ amount of the polymer dope was placed into it.

Next, the planetary stirring mixer was actuated. The stirring conditions were as the above. The stirring was performed at room temperature.

After the completion of the first stirring, the solvent was distilled off under a reduced pressure condition while it was heated. Such a stirring operation was repeated one more time to obtain a target filler carrying amylose tris(3,5-dimethylphenylcarbamate).

(3) Preparation of Filling Column for HPLC from Prepared Filler

The filler carrying amylose tris(3,5-dimethylphenylcarbamate) prepared in (2) was filled in a stainless column having a length of 25 cm and an inner diameter of 0.46 cm by means of a slurry filling method to prepare a separating column for an enantiomeric isomer.

Comparative Example 1 (Enantiomeric Isomer-Separating Filler Carrying amylose tris(3,5-dimethylphenylcarbamate))

(1) Synthesis of amylose tris(3,5-dimethylphenylcarbamate)

Amylose tris(3,5-dimethylphenylcarbamate) was prepared in the same manner as in (1) of Example 1.

(2) Allowing Silica Gel to Carry amylose tris(3,5-dimethylphenylcarbamate)

2.5 g of amylose tris(3,5-dimethylphenylcarbamate) obtained in (1) were dissolved into 25 ml of ethyl acetate at 10 times equivalent (wt/vol).

A total amount of the polymer dope was added to 22.5 g of silica gel subjected to surface inactivating treatment used in (2) of Example 1 placed into a 300-ml three-necked flask, and the resultant was evenly applied by using a blade-type stirring rod.

After the application, the solvent was distilled off under a reduced pressure condition while it was heated, to thereby obtain a target filler carrying amylose tris(3,5-dimethylphenylcarbamate).

(3) Preparation of Filling Column for HPLC from Prepared Filler

The filler carrying amylose tris(3,5-dimethylphenylcarbamate) prepared in (2) was filled in a stainless column having a length of 25 cm and an inner diameter of 0.46 cm by means of a slurry filling method to prepare a separating column for an enantiomeric isomer.

Comparative Example 2 (Enantiomeric Isomer-Separating Filler Carrying amylose tris(3,5-dimethylphenylcarbamate))

(1) Synthesis of amylose tris(3,5-dimethylphenylcarbamate)

Amylose tris(3,5-dimethylphenylcarbamate) was prepared in the same manner as in (1) of Example 1.

(2) Allowing Silica Gel to Carry amylose tris(3,5-dimethylphenylcarbamate)

20 g of amylose tris(3,5-dimethylphenylcarbamate) obtained in (1) were dissolved into 200 ml (10 times equivalent (wt/vol)) of a mixed solvent of chloroform and DMAc (vol/vol) to prepare a dope, which was divided into 2 fractions.

Next, 80 g of silica gel subjected to surface inactivating treatment (average particle size: 20 μm, average pore size: 1,300 Å) were fed into the planetary stirring mixer, and then a ½ amount of the polymer dope was placed into it.

Next, the planetary stirring mixer was actuated. The stirring conditions were as the above. The stirring was performed at room temperature.

After the completion of the first stirring, the solvent was distilled off under a reduced pressure condition while it was heated. Such a stirring operation was repeated twice to obtain a target filler carrying amylose tris(3,5-dimethylphenylcarbamate).

(3) Preparation of Filling Column for HPLC from Prepared Filler

The filler carrying amylose tris(3,5-dimethylphenylcarbamate) prepared in (2) was filled in a stainless column having a length of 25 cm and an inner diameter of 0.46 cm by means of a slurry filling method to prepare a separating column for an enantiomeric isomer.

Comparative Example 3

(1) Synthesis of amylose tris(3,5-dimethylphenylcarbamate)

Amylose tris(3,5-dimethylphenylcarbamate) was prepared in the same manner as in (1) of Example 1.

(2) Allowing Silica Gel to Carry amylose tris(3,5-dimethylphenylcarbamate)

20.0 g of amylose tris(3,5-dimethylphenylcarbamate) obtained in (1) were dissolved into 150 ml (7.5 times equivalent (wt/vol)) of ethyl acetate to prepare a dope, which was divided into 4 fractions.

A ¼ amount of the polymer dope was added to 30.0 g of silica gel subjected to surface inactivating treatment used in (2) of Example 1 placed into a 300-ml three-necked flask, and the resultant was evenly applied by using a blade-type stirring rod. After that, the remaining polymer dope (¾ amount) was placed (¼ amount per one placement: a total of 3 times), and the resultant was evenly applied.

After the application, the solvent was distilled off under a reduced pressure condition while it was heated, to thereby obtain a target filler carrying amylose tris(3,5-dimethylphenylcarbamate) However, no column was prepared because the amount of agglomerate was large.

Applied Example 1

50 μl of a solution (50 mg/ml) prepared by dissolving 50 mg of a compound I represented by the following formula into 1.0 ml of a mobile phase (ethanol) was charged into each of the separating columns for enantiomeric isomers prepared in Examples 1 to 5 and Comparative Example 1, to thereby obtain chromatograms shown in FIGS. 5 to 10.

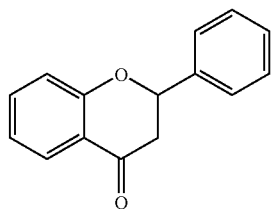

Compound (I)

Furthermore, by using a continuous liquid preparative chromatography apparatus of a small-simulated moving bed mode shown in FIG. 14, the adsorption chambers 1 to 8 were filled with the fillers prepared in Examples 1 to 5 and Comparative Examples 1 to 4, and the compound I was actually separated under the following conditions, thereby determining the productivity of a raffinate component in each filler (expressed in the mass (kg) of a racemic body that can be separated within a day per 1 kg of the filler) Table 1 shows the results. All of the resultant optical purities of the raffinate components were equal to or higher than 97% ee.

<Preparative Separation Conditions>
Temperature: 25° C.
Mobile phase: Ethanol
Step time: 1.5 minutes
Feed concentration (concentration of the solution of the compound (I) in ethanol): 50 mg/ml
Detection wavelength: 270 nm
Respective flow rates shown in Table 2 have the following meanings.
Feed flow rate: Flow rate of the solution of the compound (I) in ethanol from the line 15
Raffinate flow rate: Flow rate in the line 16
Extract flow rate: Flow rate in the line 14
Desorbed liquid flow rate: Flow rate of ethanol from the line 13.

TABLE 1

| | Example | | | | Comparative Example | | |
|---|---|---|---|---|---|---|---|
| | 1 | 2 | 3 | 4 | 1 | 2 | 3 |
| Carrying amount of polysaccharide derivative (mass %) | 35 | 40 | 30 | 25 | 10 | 20 | 40 |
| Number of carrying | 4 | 4 | 3 | 2 | 1 | 1 | 4 |
| Feed flow rate (ml/min) | 0.90 | 0.76 | 1.06 | 0.94 | — | 0.79 | — |
| Raffinate flow rate (ml/min) | 15.31 | 20.99 | 10.87 | 7.49 | — | 6.73 | — |
| Extract flow rate (ml/min) | 5.33 | 8.61 | 5.11 | 3.56 | — | 3.43 | — |
| Desorbed liquid flow rate (ml/min) | 19.74 | 28.83 | 14.92 | 10.12 | — | 9.37 | — |
| Productivity | 1.73 | 1.44 | 2.03 | 1.79 | — | 1.51 | — |

Productivity: kg-rac./kg-CSP/day,
—: Unable to sample

The invention claimed is:

1. A process for producing an enantiomeric isomer-separating filler, comprising bringing a porous carrier and a solution or dispersion of an optically active polymer compound into contact with each other through a stirring operation in a stirring device, to allow the porous carrier to carry the optically active polymer compound, wherein:
   a two-axis vertical stirring device is used as the stirring device; and
   the porous carrier is allowed to carry the optically active polymer compound in a carrying amount of 23 mass % or more.

2. The method according to claim 1, wherein the porous carrier has an average particle size in a range of 1 to 300 μm and an average pore size in a range of 200 to 8,000 Å.

3. The method according to claim 1, wherein the optically active polymer compound comprises a polysaccharide derivative.

4. The method according to claim 1, wherein the enantiomeric isomer-separating filler comprises an enantiomeric isomer-separating filler for simulated moving bed chromatography.

5. A method of producing an enantiomeric isomer-separating filler, comprising bringing a porous carrier and a solution or dispersion of an optically active polymer compound into contact with each other through a stirring operation in a stirring device, to allow the porous carrier to carry the optically active polymer compound, wherein:
   a two-axis vertical stirring device is used as the stirring device;
   a first step involving: feeding the porous carrier into the two-axis vertical stirring device; adding part of the solution or dispersion of the optically active polymer compound with a required amount being divided into multiple fractions; and allowing the porous carrier to carry the optically active polymer compound through a stirring operation of the two-axis vertical stirring device, and a second step involving drying the porous carrier carrying the optically active polymer compound to remove a solvent are performed; and
   a combination of the first step and the second step is repeated a plurality of times by using a residual solution or dispersion of the optically active polymer compound, to thereby allow the porous carrier to carry the optically active polymer compound.

6. The method according to claim 5, wherein the combination of the first step and the second step is repeated 2 to 6 times.

* * * * *